United States Patent [19]

Constein

[11] 4,414,301
[45] Nov. 8, 1983

[54] FORMED SEPARATOR SET FOR LEAD ACID BATTERIES

[75] Inventor: Ronald L. Constein, Lancaster, Pa.
[73] Assignee: Allied Corporation, Toledo, Ohio
[21] Appl. No.: 329,375
[22] Filed: Dec. 10, 1981
[51] Int. Cl.³ .............................................. H01M 2/18
[52] U.S. Cl. .................................... 429/136; 429/209; 429/254
[58] Field of Search ............... 429/136, 152, 209, 164, 429/254, 138, 146

[56] References Cited
U.S. PATENT DOCUMENTS
3,434,883  3/1969  Babusci et al. ...................... 429/241

Primary Examiner—Anthony Skapars
Attorney, Agent, or Firm—James P. DeClercq

[57] ABSTRACT

A round battery is provided with a formed separator set to replace the conventional separators, the center insulator of the positive plates, the edge insulators of the positive plates and the edge insulators of the negative plates. A formed separator set including first and second separators is provided, the separators having wall-shaped lip portions extending between first and second separators when the separators are disposed in an assembled electrode assembly and appropriately positioned to extend over and insulate the inner periphery of the positive plates or electrodes, the non-joined portions of the outer periphery of the positive electrodes, and the outer periphery of the negative plate, to separate and insulate unlike plates from each other and to prevent the formation of conductive bridges at the edges of the plates.

10 Claims, 10 Drawing Figures

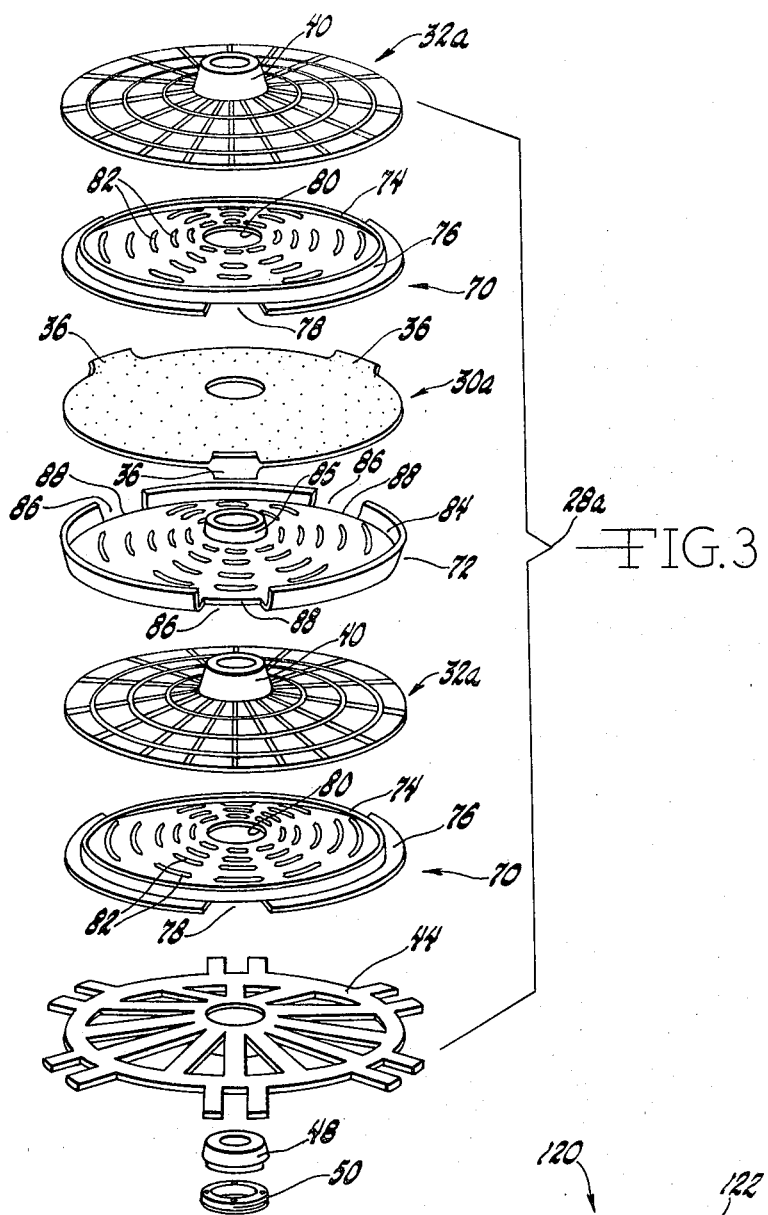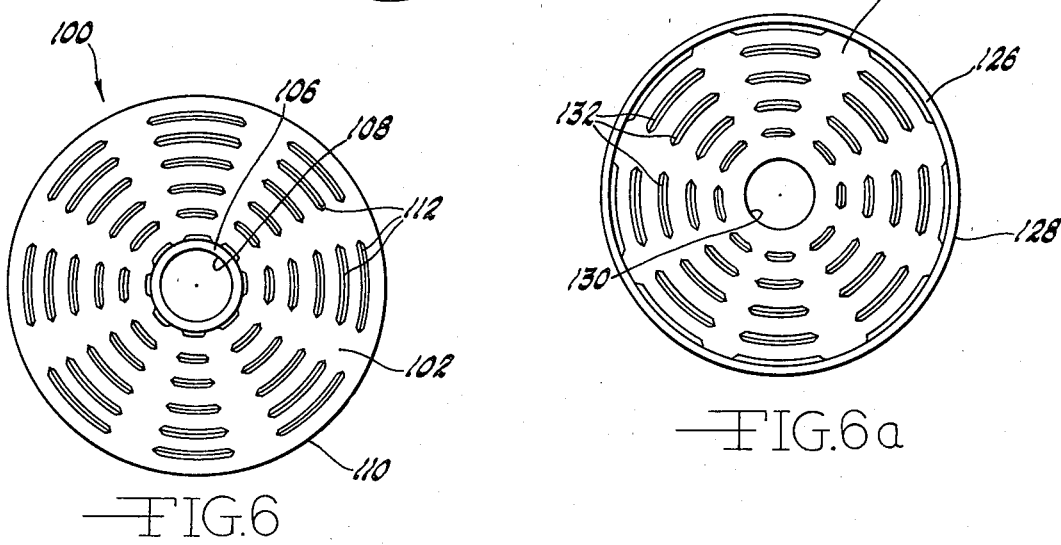

FORMED SEPARATOR SET FOR LEAD ACID BATTERIES

This application relates to insulators and separators placed between negative and positive electrodes or plates of a battery. In particular, the invention relates to a set of formed or molded insulating separators for a cylindrical lead acid secondary battery.

BACKGROUND OF THE INVENTION

It has been found that lead acid secondary batteries with plates or electrodes, primarily positive plates or electrodes, made from tetrabasic lead sulfate give advantageous results in certain applications, such as standby service, where battery life should be measured in decades. It has also been found that the most efficient and commercially practical shape for such a battery, considering volumetric efficiency and cooling surface area, is a cylinder. A proposed commercial embodiment of such a battery is shown in U.S. Pat. No. 3,765,943, issued to Biagetti on Oct. 16, 1973, entitled "Fabrication of Lead-Acid Batteries", and U.S. Pat. No. 3,899,349, issued to Yarnell on Aug. 12, 1975, entitled "Carbon Dioxide Curing of Plates for Lead-Acid Batteries", both being hereby incorporated by reference. In these illustrations, and in the actual commercial embodiment of such a battery, the positive and negative plates or electrodes are vertically interleaved, with separators between the plates or electrodes, and with separate insulators on the outer periphery of the negative plate or electrode, and on the inner circumference of the positive plate or electrode. Positive plates are joined together at their outer periphery, and negative plates or electrodes are joined together at their inner circumference. In the actual commercial embodiment of such a battery, positive plates or electrodes are joined only intermittently at their outer peripheries, the unjoined portions requiring separate insulators.

The purpose of such insulators, and of such separators, is to prevent active material which may become separated from the remainder of the mass of the plate or electrode from falling away and forming electrical shorts between positive and negative plates or electrodes to protect the electrodes from the effects of any such material that may escape, and also to prevent the formation of long, fragile hairlike dendrite growth at the edge of plates, which may form a shorting path to an adjacent plate or break off to become part of a growing conductive mass on the floor of the battery.

The separators in commercial use are disks of microporous rubber and fiberglass matting. Each negative plate or electrode is manually fitted with insulation about its outer periphery in the form of a rubber channel having a generally U-shaped cross section which is cut to length and fitted over the edge of the plate. The positive plate or electrode is fitted with insulation at its inner periphery, the insulator being a rubber circular member having a periphery in the form of an outwardly-directed U-shaped channel, which is compressed and inserted into the central opening of a positive plate, to insulate the inner edge of the plate. Then, three pieces of U-shaped rubber channel are cut to length, and fitted over the outer edge of the positive plate between three portions left free of active material for joining positive plates together. Then, the positive and negative plates or electrodes are vertically stacked and interleaved, with separating disks of porous rubber and fiberglass matting.

As will be apparent, the manual handling needed to install the central insulator in the positive plate or electrodes, the three separate outer insulators on the positive plate or electrode, and the outer insulator on the negative plate or electrode, as well as manually placing the round rubber separators and fiberglass mats in place, is apt to cause damage to the plates or electrodes even when great care is used, and the handling involved creates an undesirable opportunity for exposure of the assembler to the danger of lead toxicity.

After the battery has been successfully assembled, the edge insulators offer only marginal protection against interplate shorts, due to unavoidable gaps in the insulators, and the overlap and short edge-to-edge distances between positive and negative plates or electrodes.

The instant invention provides a set of insulators which overcomes or greatly reduces the severity of these problems.

SUMMARY OF THE INVENTION

The instant invention presents two alternate embodiments of a formed separator set for a round or cylindrical battery, which replace the separate inner, outer and round disklike insulators with unitary assemblies.

In a first embodiment, a first microporous rubber disk member having a central aperture is provided with an upstanding wall or lip portion at its inner periphery, and a second microporous rubber disk member is provided with a central aperture including an upstanding wall or lip at its outer periphery. A plurality of such first and second members alternately interleaves between the stack of alternately interleaved negative and positive plates or insulators provide improved insulation, with reduced handling, since these first and second members need merely be alternately placed over a central member between the alternately-emplaced positive and negative plates or electrodes.

A second and preferred embodiment of such unitary insulators is assembled in the same manner, but provides a further improvement in the effectiveness of the insulation. In the second embodiment, a first microporous rubber disk member having a central aperture is provided with an upstanding wall or lip portion disposed adjacent to and spaced inwardly from the outermost periphery of the disk member, and the outermost periphery of the disk member is interrupted at spaced intervals, to allow for the passage therethrough of the joining portions of positive plates or electrodes. A second disk member is provided with an upstanding wall or lip portion at its inner periphery, and a similarly upstanding wall or lip portion disposed at its outermost periphery, and interrupted at spaced intervals, forming apertures for the passage of the joining portion of the positive plates therethrough.

Thus, in either the first embodiment or in the second and preferred embodiment, the first and second insulator members envelope and insulate the plates of the battery, and are equally effective at reducing handling damage and lead exposure. The second and preferred embodiment provides insulation between positive and negative electrodes or plates, and also prevents the formation of long and fragile hairlike dendrites at the outer periphery of positive plates which can cause interplate shorts and conductive sludge buildup on the floor or bottom of the battery. Therefore, it is an object of the invention to produce a battery having a cylindrical container and including a plurality of alternately interleaved negative and positive electrodes, the negative electrodes being joined at a central portion, and the positive electrodes being joined at outer peripheral portions, including first insulating separators having a lip disposed approximately perpendicular to a first surface about an inner periphery, and a second insulating separator having a lip member being disposed approximately perpendicular to a surface thereof about an outer periphery assembled so that the second lip of the second separator is disposed adjacent an outer periphery of a negative electrode, and a first lip of a first separator is disposed adjacent an inner periphery of a positive electrode, so that the first lip contacts the second separator and the second lip contacts the first separator to insulate the electrodes from each other and insulate the inner peripheries of the positive electrodes and the outer peripheries of the negative electrodes.

It is a feature of the invention that the number of separate insulator members needed to insulate and separate the electrodes of such a battery is greatly reduced.

It is an advantage of the invention that manual handling is greatly reduced, greatly reducing the opportunity for mechanical damage during assembly and reducing the exposure of the assembler to a toxic metal.

It is a further object of the invention to provide such a formed separator set which further insulates the outer periphery of positive electrodes, with the exception of the portions which join positive electrodes together, by providing the first separators with a third lip portion formed by a wall portion adjacent to and spaced inwardly from its outer periphery which is appropriately cut away to allow passage of the joining members therethrough, and providing the second separators with an outer rim portion, also appropriately cut away, the third lip portion contacting the outer rim portion to envelope those portions of the outer periphery of a positive plate which do not comprise joining members.

It is a feature of the invention that both inner and outer edges of both negative and positive plates may be insulated without an increase in the number of insulating pieces needed.

It is an advantage of the invention that a battery including such separators may be assembled with greater ease, with fewer damaged electrodes, resulting in a battery which is more dependable, at a decreased cost.

BRIEF DESCRIPTION OF THE DRAWINGS

FIG. 3 is an exploded view showing assembly of positive and negative plates or electrodes in a battery incorporating formed separators according to the preferred embodiment of the invention.

FIGS. 6 and 6a are top perspective views of first and second formed separators, respectively, in accordance with the first embodiment of the invention.

DESCRIPTION OF THE PREFERRED EMBODIMENTS

Figure 1:
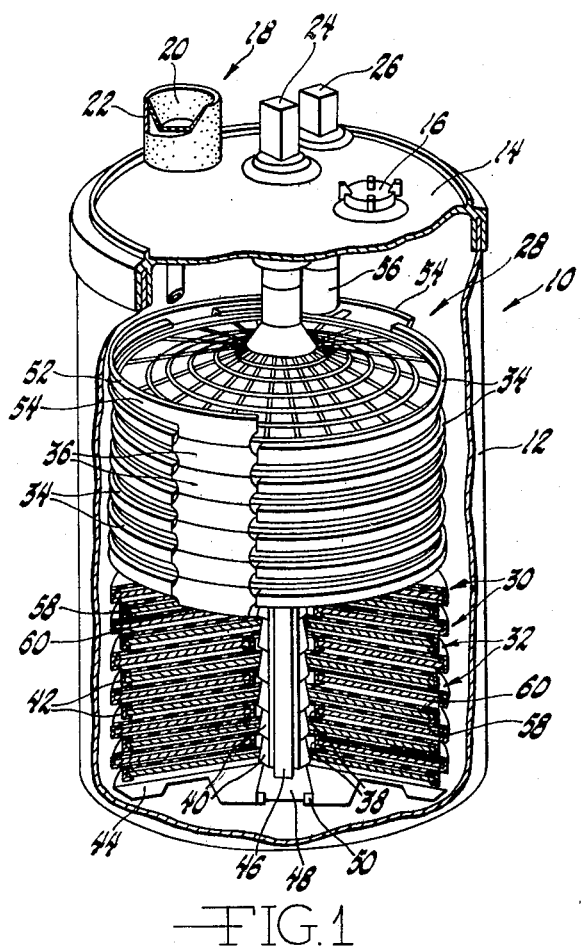
FIG. 1 is a sectioned perspective view of a battery including prior art separators and insulators.

In FIG. 1 there is shown a conventional round battery 10 having a case 12, a top cover 14 including a filler plug 16, a flame barrier vent 18 including a funnel member 20 and a porous ceramic flame barrier member 22 in communication with the interior of battery 10, and through which negative terminal 24 and positive terminal 26 protrude.

Battery 10 includes an electrode assembly 28 which includes a plurality of positive plates or electrodes 30 and a plurality of negative plates or electrodes 32 alternately interleaved with each other, and appropriately connected to other like plates or electrodes and separated from unlike plates or electrodes.

As shown in FIG. 1, pieces of channel-shaped insulator 34 are conventionally cut to length and emplaced on the outer peripheral edges of positive plates or electrodes 30 between joining portions 36 which interconnect the positive plates 30 at three places around the outer periphery of the positive plates as illustrated in FIG. 1. Inner peripheral portions of positive plates or electrodes 30 are insulated with circular insulators 38 having an outwardly-directed U-shaped channel configuration. Negative plates or electrodes are joined together at hub portions 40. As will become apparent, hub portions 40 are configured so that negative plates or electrodes 32 may be stacked, hub portions 40 forming a central conductive column. The outer peripheral edges of negative plates or electrodes 32 are insulated with a channel-shaped insulator 42 having a U-shaped channel configuration, which is cut to length and placed around the outer peripheral edge of each negative plate or electrode 32. The column formed by hub portions 40 is electrically connected to bottom support member 44, which is electrically connected to a central rod 46 by means of a socket member 48 retained in bottom support member 44 by nut 50. Central rod 46 is electrically connected to negative terminal 24. Positive plates are connected to each other by connecting joining portions 36 by welding or the like, and then the joined joining portions 36 are connected to a positive collector ring having joining portions 54 and which contains a member 56 which is electrically connected to positive terminal 26. A top cover member may also be provided, to protect the uppermost electrode from the impact of electrolyte poured through the opening for filler plug 16. The positive and negatives plates or electrodes 30 and 32 are insulated from each other by conventional separators 58, 60.

Figure 2:
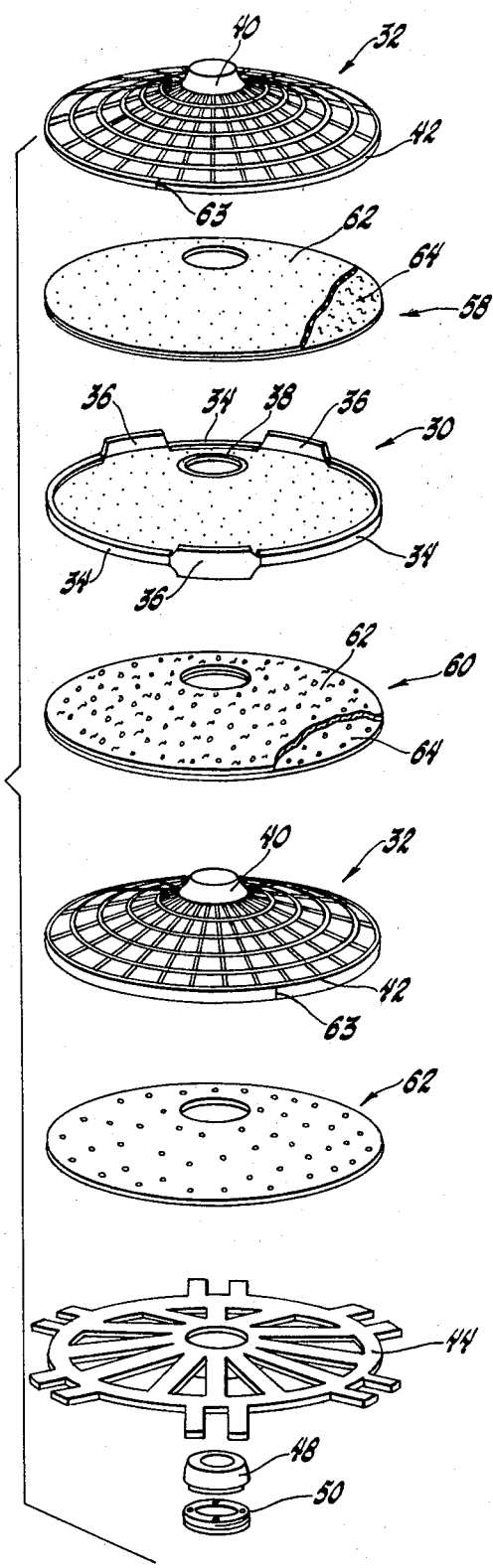
FIG. 2 is a partial exploded view showing the assembly of positive and negative electrodes or plates in the battery of FIG. 1.

FIG. 2, a partial exploded view, shows the assembly of the conventional battery of FIG. 1 in greater detail. Central rod 46 is fitted into socket member 48, which is then retained to bottom support member 44 by a nut 50 cooperating with a threaded aperture in bottom support member 44. Then, a separator 62 is placed over rod 46. A negative plate or electrode 32, fitted with a section of channel-shaped insulator 34 wrapped around its outer periphery, possibly leaving a gap at seam 64, is placed over rod 46. Next, a separator assembly 60 is placed over rod 46.

As shown, separator assembly 60 includes a separator 62 and a glass fiber mat 64, intended to permit bubbles of evolved gas to escape. In this regard, it should be noted that positive plates or electrodes 30 and negative plates or electrodes 32 are generally frustoconical in shape, having a slight angle of approximately ten degrees (10°) to allow bubbles of gas evolved during operation to migrate to the center of the battery and escape. Thus, separator 62 is preferably preformed in a frustoconical shape, while glass fiber mat 64 may be cut and overlapped. This slight angle results in various portions of battery 10 which appear to be approximately perpendicular to each other and presenting a visual appearance of perpendicularity due to the large size of such batteries, the smallest being approximately one-third of a meter in diameter. Thus, the term approximately perpendicular will be used to desginate items which are separated from each other by an angle of approximately 90°, allowing for the small slope given to positive and negative electrodes 30 and 32 for dissipation of evolved gases.

Then, a positive plate or electrode 30 is fitted with a circular insulator 38, and with three pieces of channel-shaped insulator 34, and placed over rod 46. Finally an insulator assembly 58 is applied, the assembly including a glass fiber mat 64 and a separator 62. This sequence is continued, beginning with another negative plate or electrode 32, until a battery of the desired number of electrodes is obtained.

Referring now to FIG. 3, an electrode assembly 28a, including the preferred embodiment of the invention, is illustrated. As before, a central rod, not shown in FIG. 2, is retained in a bottom support member 44 by a socket member 48 and nut 50. However, with the preferred embodiment of the invention, and also with the first embodiment of the invention, assembly is greatly simplified. With the second and preferred embodiment, an insulating separator 70 is placed over the central rod, and followed with an uninsulated negative plate or electrode 32, an insulating separator 72, an uninsulated positive plate or electrode 30a, an insulating separator 70, and another uninsulated plate or electrode 32a. This sequence is continued as desired.

Figure 7:
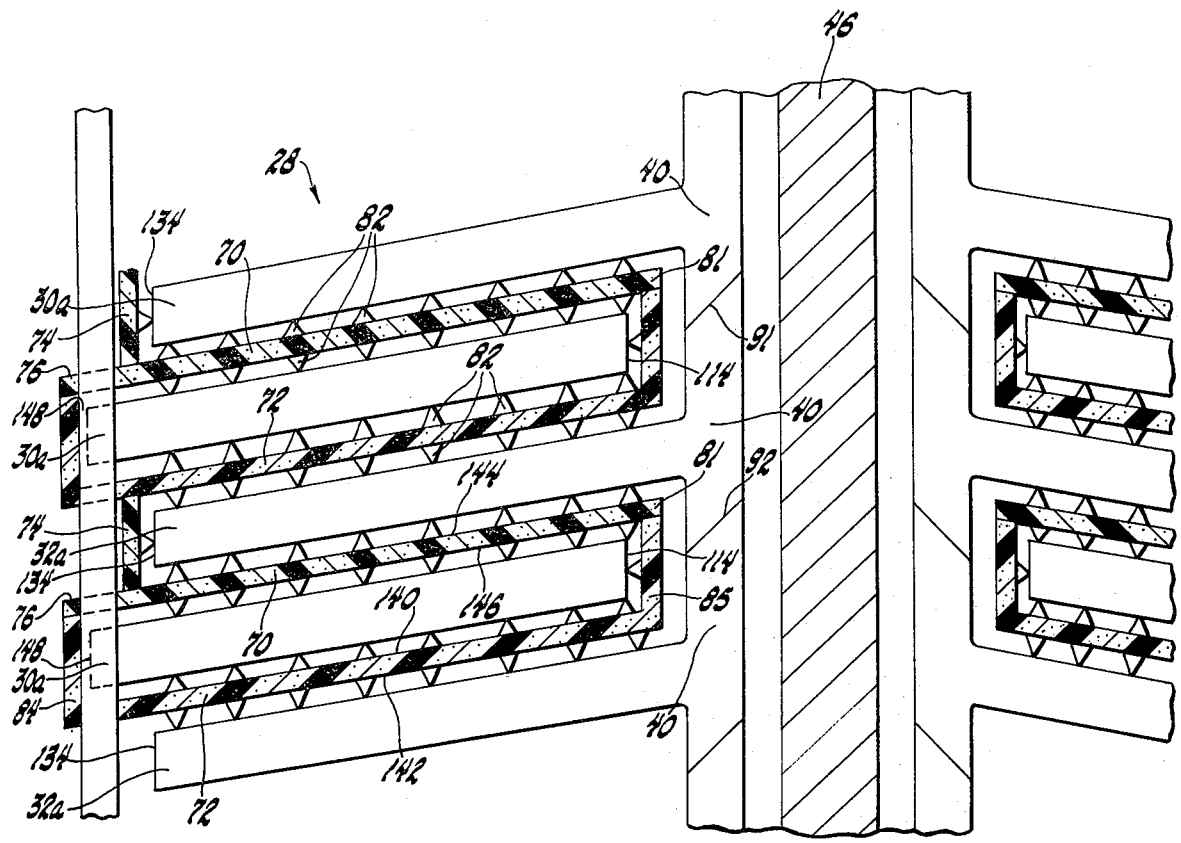
FIG. 7 is a partial diametral sectional view of a battery incorporating the preferred embodiment of the invention.
Figure 8:
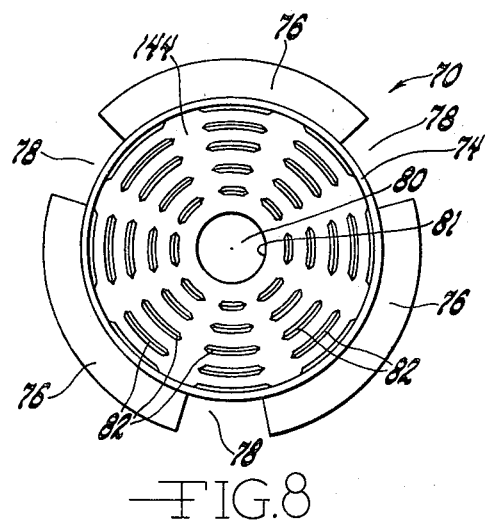
FIGS. 8 and 8a are top elevational views of first and second formed separators, respectively, in accordance with the preferred embodiment of the invention shown in FIGS. 3 and 7.
Figure 8A:
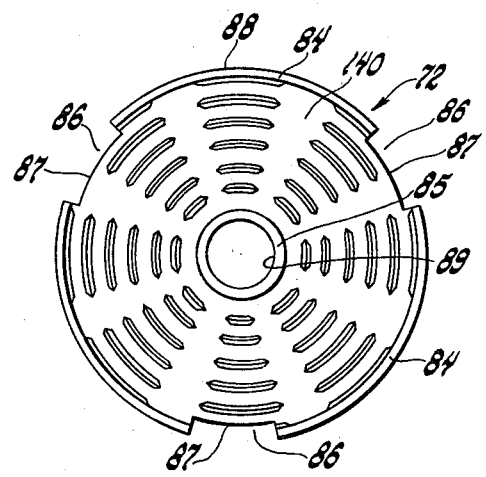

Insulators 70 and 72 are shown in plan view in FIGS. 8 and 8a, and also in installed position and configuration in FIG. 7. Insulating separator 70 includes a wall or lip portion 74 about the outer periphery of insulator 70 and approximately perpendicular to a surface of insulator 70, which is adjacent to and inset by a predetermined distance from the outer periphery of insulator 70, forming an outer rim portion 76 which is interrupted leaving apertures 78 to accommodate joining portions 36 of positive plates or electrodes 30a. Insulator 70 is also provided with a wall-shaped lip member 80 about its inner periphery, and is further provided with a plurality of projections 82, in the form, preferably, of interrupted circular ridges, to allow the escape of evolved gases without the necessity of a glass fiber mat such as mat 64, although, such a glass fiber mat may still be used if desired, as may be appropriate for certain applications.

Similarly, insulating separator 72 includes a wall-shaped lip member 84 about its outer periphery, which is formed with interruptions or removed wall sections 86 to accommodate joining portions 36, and, depending on the relative dimensions involved, a section of the disklike surface of insulating separator 72 in addition to that immediately adjacent the base of lip member 84, may be removed forming an aperture 88 adjacent interruptions or removed wall sections 86. In some applications, apertures 88 may be limited to that portion which may be visualized as the portion of insulating separator 72 which formed the support for the removed section of wall-shaped lip member 84. Insulating separator 72 is also provided with a centrally-located wall-shaped lip member 85.

Insulating separator 72 may also include a plurality of projections 90, preferably in the form of interrupted circular ridges, to facilitate the escape of evolved gases, although, particularly in the case of surfaces of insulating separators 70 or 72 which are adjacent the lower side of an electrode in the installed or operating position of battery 10 may not require the provision of such ridges to provide space for the escape of bubbles of evolved gas, being maintained spaced away from the electrodes or plates by the force of gravity.

Also, wall-shaped lip members such as 74, 85 and 86 may also be provided with projections such as projections 82 to space them away from the relevant plate or electrode, if desired.

Figure 4:
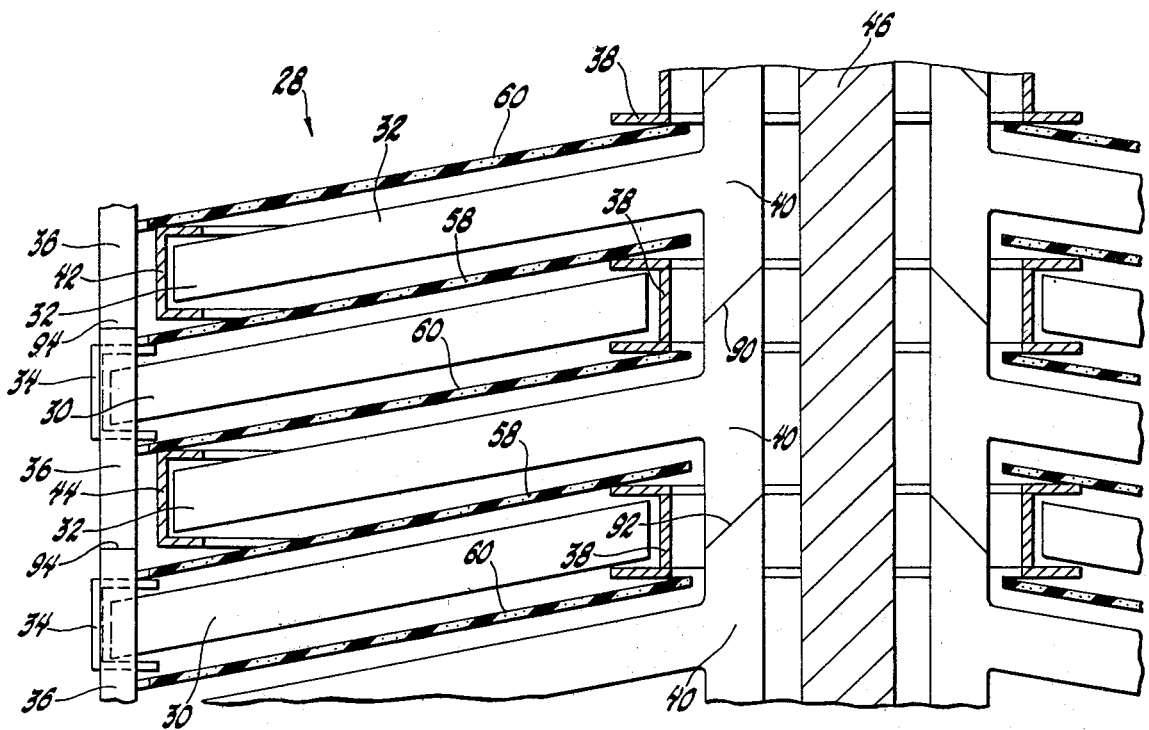
FIG. 4 is a partial diametral sectional view of the battery of FIG. 1 showing the assembly of the prior art insulators and separators.

Referring now to FIG. 4, the basic structure of a conventional battery such as battery 10, and the insulators conventionally used are shown in detail in a partial diametral sectional view. Some shading lines have been omitted for clarity, as are the glass fiber mats 64 conventionally used between separators and plates or electrodes. In this regard, it may also be noted that the drawings do not show that conventional batteries have one more negative plate or electrode than positive plates or electrodes, the cell assembly being assembled such that a negative plate or electrode appears at opposite ends of the cell stack.

As shown in FIG. 4, central rod 46 is surrounded by the hub portions 40 of negative plates or electrodes 32, each hub portion 40 being provided with beveled surfaces 90 and 92 which are parallel to each other, so that negative plates or electrodes 32 may be stacked, with their respective hub portions 40 forming a central column surrounding central rod 46. Positive plates or electrodes 30 are supported around their outside diameter, by joining portions 36, which are joined together at surfaces 94, such as by welding. Each positive plate or electrode 32 is fitted with a circular insulator 38 which defines an outwardly-facing circular channel, and also with three pieces of channel shaped insulator 34 on its outer periphery between joining portions 36, before being alternately stacked with a negative plate or electrode 32. Negative plate or electrode 32 is itself fitted with a length of channel shaped insulator 42 around its outer periphery before being placed in electrode assembly 28. After each plate or electrode 30 or 32 is placed into electrode assembly 28, a separator assembly such as 58 or 60 is implaced. As will be seen, this presents a functional but comparatively complex assembly and method of assembly.

Figure 5:
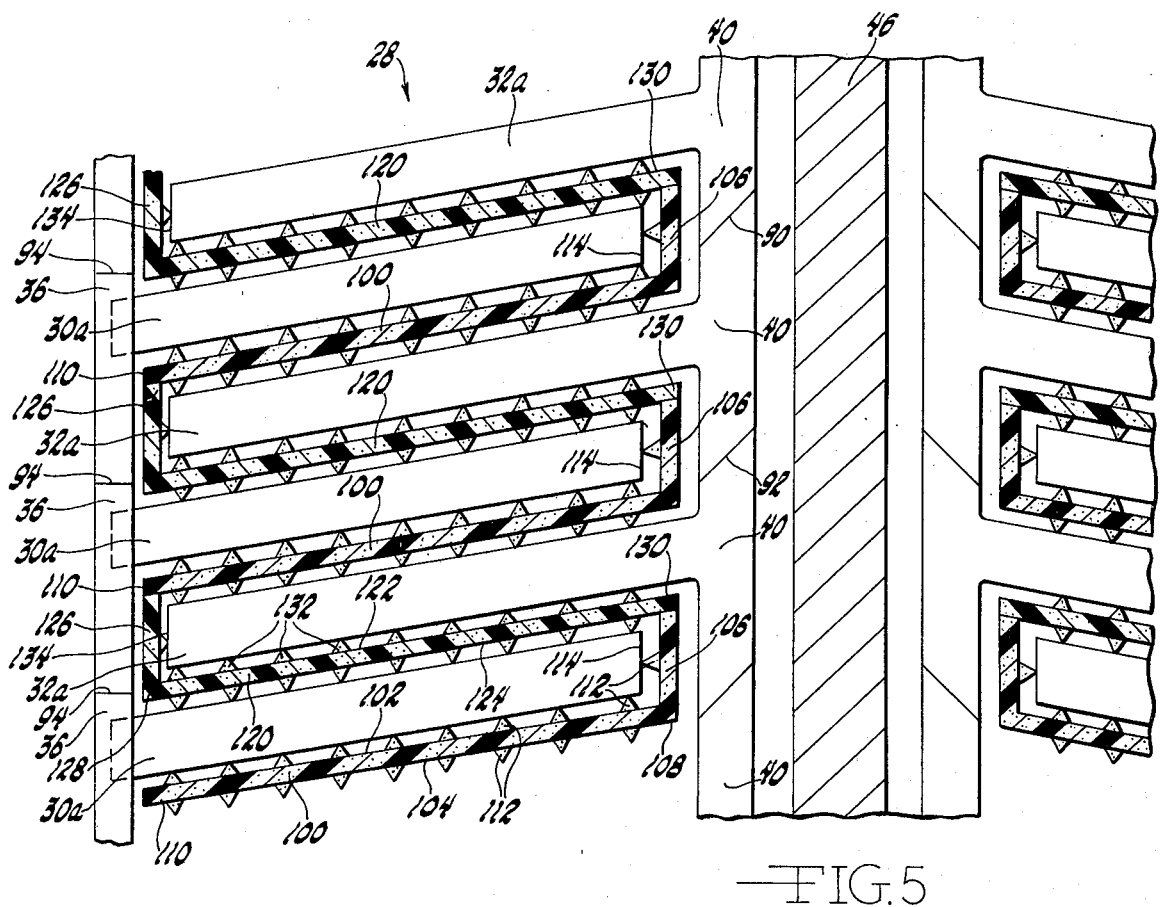
FIG. 5 is a partial diametral sectional view of a battery including formed separators according to a first embodiment of the invention.

The first embodiment of insulating separators according to the invention is shown in FIG. 5, and provides a much simpler and more convenient assembly, with fewer parts subject to erroneous assembly or failure, which provides adequate insulation for some uses of a battery 10, although omitting the double protection of insulating both positive and negative plates or electrodes to insure that failure of the insulation of one of the two will not permit the formation of conductive bridges between opposite plates or electrodes. In assembling a battery incorporating the first embodiment of the invention, after the hub portion 40 of a first negative plate or electrode 32a has been placed over central rod 46, an insulating separator 100, as shown in FIG. 6, is placed over central rod 46. Insulating separator 100 has a first surface 102 and a second surface 104 parallel to surface 102, and includes a wall-shaped lip member 106 which is disposed approximately perpendicular to surface 102 about inner periphery 108 of insulating separator 100. Separator 100 also has an outer periphery 110. Separator 100 may also include a plurality of projections 112 on surface 102, surface 104, or on a surface of lip member 106 disposed adjacent inner periphery 114 of a positive plate or electrode 30a. These projections, if used, are preferably in the form of interrupted circular ridges having a V-shaped cross section. As stated above, if used, the projections 112 may be omitted from surface 102 or from lip member 106. Also, as noted above, the lip members of insulating separators according to the invention are described as being approximately perpendicular to surfaces of the separators, to allow for the slight angle, approximately ten degrees, given to positive and negative electrodes to facilitate bubble escape, resulting in a frustoconical appearance.

The preferred embodiments of insulating separators are made from microporous rubber, a soft and very flexible material which conforms to the electrodes. Being resilient, it can be made slightly smaller or larger than the relevant dimension of the electrode it insulates to allow it to be slightly stretched over the electrode and assume the shape of its edge. Also, molding draft may or may not be provided, since the flexible resilience of the preferred material, microporous rubber, allows easy removal from a mold without the provision of molding draft, if desired.

Next, a positive plate or electrode 30a is placed over the central rod 46, and followed with an insulating separator 120, as shown in FIG. 6a. Separator 120 includes a surface 122, and a surface 124 parallel to surface 122, and a wall-shaped lip member 126 disposed approximately perpendicular to surface 122 about outer periphery 128 of separator 120. Separator 120 also defines an inner periphery 130. As before, projections 132, similar to projections 82 and 112, may be applied to surface 122, 124, or the surface of lip member 126 adjacent outer periphery 134 of negative plate or electrode 32a. Thus, it will be seen that these first mentioned two insulating separators cooperate to insulate the inner periphery 114 of a positive or electrode 32a, lip member 106 of separator 100 contacting inner periphery 130 of separator 120.

Then, in the assembly sequence, an insulating separator 100 is placed over central rod 46, outer periphery 110 of this separator contacting lip member 126 of the previous separator 120 to insulate the outer periphery 134 of the negative plate or electrode 32. This sequence continues with a positive plate or electrode 30, a separator 120, a negative plate or electrode 32a, a separator 100, so forth, until the electrode assembly 28 is complete.

Referring to now FIG. 7, in conjunction with FIGS. 8 and 8a, there is shown an electrode assembly 28 fitted with insulating spacers according to the second and preferred embodiment of the invention. The assembly sequence of the embodiment shown in FIG. 7 differs from that with respect to FIG. 5 only in that insulating spacers 70 and 72 are used in place of insulating spacers 100 and 120. As mentioned above, portion described as approximately perpendicular to other portions may differ from perpendicularity due allowance for bubble escape, the nature of the material used, the provision of molding draft, the exact shape of the edges of the electrodes, a decision on whether or not the resiliency of the separators should be used to make them conform more closely to the plates or electrodes, and the like.

As viewed in section in installed position, insulating separators 72 have a first surface 140 and a second surface 142 parallel to surface 140, and insulating separators 70 have a third surface 144 and a fourth surface 146 parallel to surface 144, and are disposed in the assembly with surfaces 140 and 146 facing towards each other. Thus, lip members 84 and 85 insulate outer peripheral sections 148 of positive plate or electrode 30a, and inner periphery 114, respectively, by contacting insulating separator 70 upon surface 146 at outer rim portion 76, formed by displacing lip portion 74 about the outer periphery, inwardly by a predetermined amount, and adjacent inner periphery 81 of separator 70. To insulate the outer periphery 134 of a negative plate or electrode 32a, lip member 74 contacts surface 142 of an adjacent insulating separator 72. As above, these separators may or may not include projections 82, these projections preferably being interrupted circular projections having a V-shaped cross-section, upon sufaces 140, 142, 144 or 146, or upon the surfaces of first, second and third lip members 85, 74 and 84, and may or may not be used together with glass fiber mats such as mats 64.

There are obviously several alternative embodiments of the invention which are the equivalent of the illustrated invention, such as made by interchanging the arrangement of positive and negative electrodes, and effectively detaching lip members such as 74, 84 and 85 from the insulating separators of which they are now a part and attaching them to the insulating separators which they are shown as contacting. These and other modifications will be obvious to one skilled in the art, and may be made without departing from the spirit and scope of the invention.

I claim:
1. A battery, comprising:
   a cylindrical container forming a housing for said battery;
   a plurality of frustoconical positive electrodes disposed within said container;
   a plurality of frustoconical negative electrodes disposed within said container;
   said positive electrodes and said negative electrodes being alternately interleaved within said container;
   said negative electrodes being adapted to be joined together at a central portion thereof and to form a central negative column;
   said positive electrodes being joined together at predetermined intervals about their respective outer peripheries, each said frustoconical positive electrode having an outer periphery;
   a plurality of first unitary insulating and separating means and a plurality of second unitary insulating and separating means alternately disposed between said interleaved positive electrodes and negative electrodes;
   said first unitary separating and insulating means including a first surface portion and a second surface portion and defining a first inner periphery and a first outer periphery, a first lip portion being disposed approximately perpendicular to said first surface portion about said inner periphery;

said second unitary separating and insulating means including a third surface portion and a fourth surface portion and defining a second inner periphery and a second outer periphery, a second lip portion being disposed approximately perpendicular to said third surface about said second outer periphery;

each said first lip portion being disposed adjacent an inner periphery of one said positive electrode;

each said second lip portion being disposed adjacent an outer periphery of one said negative electrode;

each said first lip being adapted to contact one said fourth surface to insulate one said inner periphery of one said positive electrode;

each said second lip portion being adapted to contact one said second surface to insulate one said outer periphery of one said negative electrode;

one said first surface portion and one said fourth surface being disposed on opposite sides of one of said positive electrodes.

2. A battery according to claim 1, wherein:

said first unitary insulating and separating means includes a third lip disposed about an outer periphery of said first surface and approximately perpendicular thereto;

said third lip being adapted to contact said second surface to at least at intervals insulate the outer periphery of each said positive electrode.

3. A battery according to claim 1 or 2, wherein:

said second surface includes a plurality of projections therefrom; and said fourth surface includes a plurality of projections therefrom.

4. A battery according to claim 3, wherein:

said first surface includes a plurality of projections therefrom; and said third surface includes a plurality of projections therefrom.

5. A battery according to claim 3, wherein:

said projections from said second surface and said projections from said fourth surface are interrupted circular ridges.

6. A battery according to claim 4, wherein:

said projections from said first surface and said projections from said third surface are interrupted circular ridges.

7. A battery according to claim 1 or 2, wherein:

said first insulating and separating means and said second insulating and separating means are formed of microporous rubber.

8. A formed separator set for a battery having a plurality of first electrodes and second electrodes, said first electrodes being alternately interleaved with said second electrodes, said second electrodes being adapted to be joined together at a central portion thereof, said first electrodes including joining portions and being adapted to be jointed together at said joining portions at intervals around an outer periphery of said first electrodes, comprising:

a plurality of first separators each having a first surface and a second surface parallel to said first surface, and defining a first inner periphery and a first outer periphery, and including a first lip member disposed approximately perpendicularly to said first surface about said first inner periphery and adapted to be disposed between one said first electrode and one said second electrode to insulate said first electrode from said second electrode and to insulate an inner periphery of one of said first electrodes;

a plurality of second separators each having a third surface and a fourth surface parallel to said third surface, and defining a second inner periphery and a second outer periphery, and including a second lip member disposed approximately perpendicularly to said third surface about said second outer periphery and adapted to be disposed between one said first electrode and one said second electrode with said fourth surface disposed facing towards one said first surface and with said second lip contacting said second surface to insulate an outer periphery of one said second electrode, and to insulate one said first electrode from one said second electrode;

said first lip being adapted to contact one said fourth surface to insulate said inner periphery of said first electrode.

9. A formed separator set for a battery having a plurality of first electrodes and second electrodes, said first electrodes being alternately interleaved with said second electrodes, and said second electrodes being adapted to be joined together at a central portion thereof, said first electrodes including joining portions and adapted to be joined together at said joining portions at intervals around an outer periphery of said first electrodes comprising:

a plurality of first separators each having a first surface and a second surface parallel to said first surface, and defining a first inner periphery and a first outer periphery, and including a first lip member and a third lip member;

said first lip member being disposed approximately perpendicularly to said first surface about said first inner periphery;

said third lip member being disposed approximately perpendicularly to said first surface about said first outer periphery, said third lip member defining interrupted sections, said interrupted portions being adapted to allow one said joining portion to pass therethrough, said first and second surfaces of said first separator defining an aperture adjacent each said interrupted portion to allow one said joining portion to pass therethrough;

said first separators being adapted to be disposed between one said first electrode and one said second electrode to insulate an inner periphery of said first electrode and to insulate portions of an outer periphery of said first electrode removed from said interrupted portions;

a plurality of second separators each having a third surface and a fourth surface parallel to said third surface, and defining a second inner periphery and a second outer periphery, and including a second lip member;

each second lip member being disposed approximately perpendicularly to said third surface about said second outer periphery and inset from said second outer periphery by a predetermined distance to form an outer rim portion, said outer rim portion defining apertures therethrough adapted to allow said joining portions to pass therethrough;

said second separators being adapted to be disposed between one said first electrode and one said second electrode to insulate one said first electrode from one said second electrode and to insulate an outer periphery of one said second electrode;

said first separators and said second separators being adapted to be disposed with one said fourth surface facing toward one said first surface;

said first lip being adapted to contact said fourth surface to insulate said inner periphery of one said first electrode;

said second lip being adapted to contact one said second surface to insulate said outer periphery of one said second electrode;

said third lip being adapted to contact said outer rim portion to insulate said outer periphery of one said first electrode removed from said joining portions of said first electrode.

10. A formed separator set for a battery having a plurality of first electrodes and second electrodes, said first electrodes being alternately interleaved with said second electrodes, and said second electrodes being adapted to be joined together at a central portion thereof, said first electrodes including joining portions and adapted to be joined together at said joining portions at intevals around an outer periphery of said first electrode, comprising:

a plurality of first separators each having a first surface and a second surface parallel to said first surface, and defining a first inner periphery and a first outer periphery;

a plurality of second separators each having a third surface and a fourth surface parallel to said third surface, and defining a second inner periphery and a second outer periphery;

said first and second separators being adapted to be disposed alternately between said alternately interleaved electrodes with said first surface facing towards said fourth surface, and one said second surface facing towards one said third surface, to separate said first electrodes from said second electrodes;

said formed separator set including a first lip member extending between said first surface and said fourth surface adjacent an inner periphery of one said first electrode, a second lip member disposed between said one said third surface and said second surface adjacent an outer periphery of one said second electrode, and a third lip member disposed between said first surface and said fourth surface adjacent circumferentially-spaced portions of said outer periphery of said first electrodes;

said first lip member being disposed approximately perpendicularly to said first surface and said fourth surface adjacent said first inner periphery and said second inner periphery;

said second lip member being disposed approximately perpendicularly to said one said third surface and to said second surface, said second lip portion being disposed about said first outer periphery and said second outer periphery and inset from said first outer periphery and said outer periphery by a predetermined distance;

said first lip portion being adapted to cooperate with said first surface and said fourth surface to insulate said inner periphery of said first electrode, said second lip portion being adapted to cooperate with said second surface and one said third surface to insulate the outer periphery of one said second electrode, said second lip portion being disposed about said first outer periphery and said second outer periphery and inset from said first outer periphery on said second outer periphery by a predetermined amount;

said third lip portion being adapted to cooperate with said first surface and said second surface to insulate at least at intervals said outer periphery of one said first electrode.

* * * * *